INVENTOR
WILLIAM O. BOSCHEN
BY
Samuelson & Jacob
ATTORNEYS

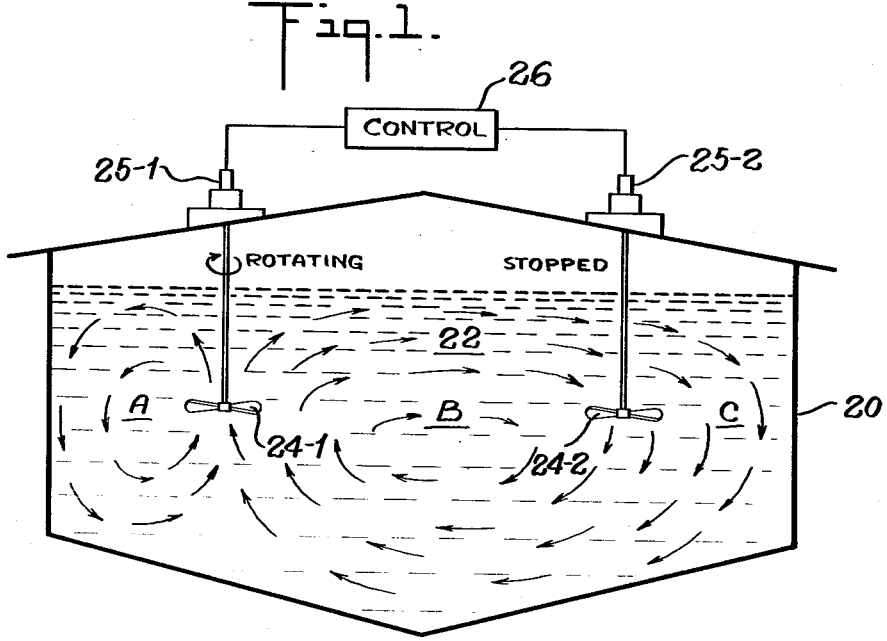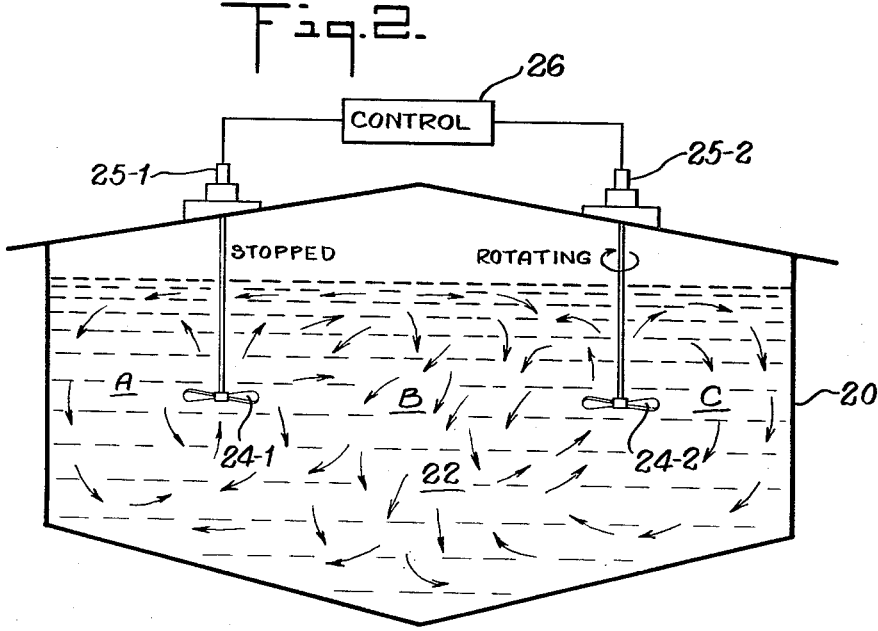

Dec. 5, 1967   W. O. BOSCHEN   3,356,347
METHOD OF PRODUCING A UNIFORMLY DISTRIBUTED, TRUE, INTERFERING
CURRENT, MIXING CONDITION AND APPARATUS THEREFOR
Filed Aug. 16, 1966   4 Sheets-Sheet 4

INVENTOR
WILLIAM O. BOSCHEN
BY
Samuelson & Jacob
ATTORNEYS

United States Patent Office 3,356,347
Patented Dec. 5, 1967

3,356,347
METHOD OF PRODUCING A UNIFORMLY DISTRIBUTED, TRUE, INTERFERING CURRENT, MIXING CONDITION AND APPARATUS THEREFOR
William O. Boschen, Tenafly, N.J., assignor to Ralph B. Carter Company, Hackensack, N.J., a corporation of New York
Filed Aug. 16, 1966, Ser. No. 572,854
15 Claims. (Cl. 259—104)

The invention relates to a method of producing uniformly distributed, true, interfering current, mixing conditions throughout the liquid mixture in a large vessel—in the absence of baffles, partitions or flow intercepting surfaces and to apparatus for carrying out the method.

In order to create and maintain a nonstratified, homogeneous liquid mixture in a large vessel when the mixture is made up of a plurality of ingredients which normally separate from each other, it is necessary to set up turbulence within the vessel to mix the contents or to keep the contents mixed. When it is necessary, as in a chemical or biological reaction, not only to produce a uniform mixture of multiple ingredients but also to maximize intercollisions of dissimilar matter, then the rate of the reaction itself will be dependent on the degree to which true, interfering current, turbulent, nonlaminar liquid motion is induced. Most commonly, this is accomplished by inducing motion of the ingredients from a single point in the vessel and inserting baffles, projections or flow interfering structures in the vessel, positioned transverse to the normal lines of liquid motion so as to change laminar flow to turbulent flow. If the internal structure is properly chosen and the motion is carried on for a sufficient period of time, effective mixing of the ingredients will be obtained and a satisfactory rate of particulate intercollisions will be induced.

Another common current practice induces motion of the ingredients from one or more points without the use of baffling devices. Heretofore, however, it has never been possible to produce true, interferring current, turbulent mixing with such systems. These systems produce an essentially pumping motion of the vessel contents in which the particles move round and round in relatively fixed relationship to each other. True mixing in such a system occurs only through viscous friction in a two dimensional manner. Such systems, while inefficient converters of energy for any mixing purpose, are particularly unsatisfactory where chemical and biological reaction is important.

It should be noted that some common misconceptions concerning pumping and mixing exist. Usually, one considers that pumping takes place in long, constricted environments such as pipes and that mixing takes place in vessels. While this is generally correct, it is not always true. For example, if liquid motion is induced at one point in a large tank so that there is an essentially uniform, relatively laminar circulatory motion of the liquid mass, then this motion is more properly described as "pumping," not "mixing." On the other hand, if a device sets up interfering currents in a pipe or other conduit, then this device is mixing the ingredients even though movement through the pipe (pumping) may be effected from the same or another source of energy.

Broadly then, mixing is defined as the maximizing of turbulent liquid movement and the minimizing of uniform or laminar liquid flow. Pumping is defined as the maximizing of uniform or laminar liquid flow and the minimizing of turbulent liquid movement. With these definitions in mind, it can be seen that the container configuration alone does not necessarily determine if the ingredients are being mixed or pumped.

In many situations a very high degree of and efficiency in mixing is desired; yet for other reasons it is very undesirable to place baffles, projections, or other turbulence producing structures within the container. Thus, it is an important object of the invention to provide a true mixing method of high efficiency without using baffles, projections or other flow interfering surfaces in the vessel.

It is a further object of the invention to provide such a method wherein a true mixing action is obtained without baffling by inducing motion of the ingredients from a plurality of points within the vessel, so spaced, selectively sequenced, and operated for periods of time, such that the induced motion from one point counteracts the motion induced from the previous point and sets up a new motion pattern whereby, after a plurality of such periods of time, there is produced a series of short duration, interfering current, liquid mixing, motions throughout the entire contents of the vessel.

It is a still further object of the invention to provide such a method wherein motion is induced from a point essentially diametrically opposite the preceding point in the sequence, for at least half of the sequences and wherein this condition is approached as nearly as practical during the other half of the sequences.

It is a still further object of the invention to provide apparatus to carry out the method wherein the means for inducing the motion is a plurality of movable mechanical elements, and a control system to schedule the operation of the individual elements.

It is a still further object of the invention to provide such apparatus wherein the means for inducing the motion is a plurality of gas ports located in the vessel together with means for supplying gas thereto, and a control system to schedule the operation of the individual ports.

It is a still further object of the invention to provide such apparatus wherein the means for inducing the motion is a plurality of large-bubble generators, and a control system to schedule the operation of the generators.

It is a still further object of the invention to provide such apparatus wherein the spaced points for inducing the motion are disposed horizontally in the vessel, located outwardly from the center between one third and two thirds of the straight line distance from the center to the side wall.

These and other objects, advantages, features and uses will be apparent during the course of the following description.

The method and apparatus of the invention may be used in many applications. For example, in many food processes which require a high efficiency conversion of horsepower to true mixing energy, it would be desirable to avoid the use of baffles to convert pumping energy to mixing energy, and also to avoid the use of current, inefficient methods of non-baffled mixing. Similarly, in the treatment of water and waste water it is often necessary to maximize the contacts and collisions between the bacteria and the bacteria food particles in the waste. Particularly in anaerobic waste water processes it is highly desirable to do this without baffles and similar buried structure. It is well known that the reaction rate of these processes and many chemical processes is proportional to the contact rate among the ingredients. It can thus be seen that this invention, applied in an anaerobic reactor, for example, will speed up the reaction and shorten the time required to produce inert matter from the organic materials, the bacteria, and the other ingredients of the process.

In the accompanying drawings, forming a part of this application, and in which like numerals are employed to designate like parts throughout the same:
FIGURES 1 through 4 are diagrammatic elevational views of a large vessel showing the various flow conditions produced within the entire volume of the contents of the vessel when two motion inducing means are operated alternately;

Figure 3:
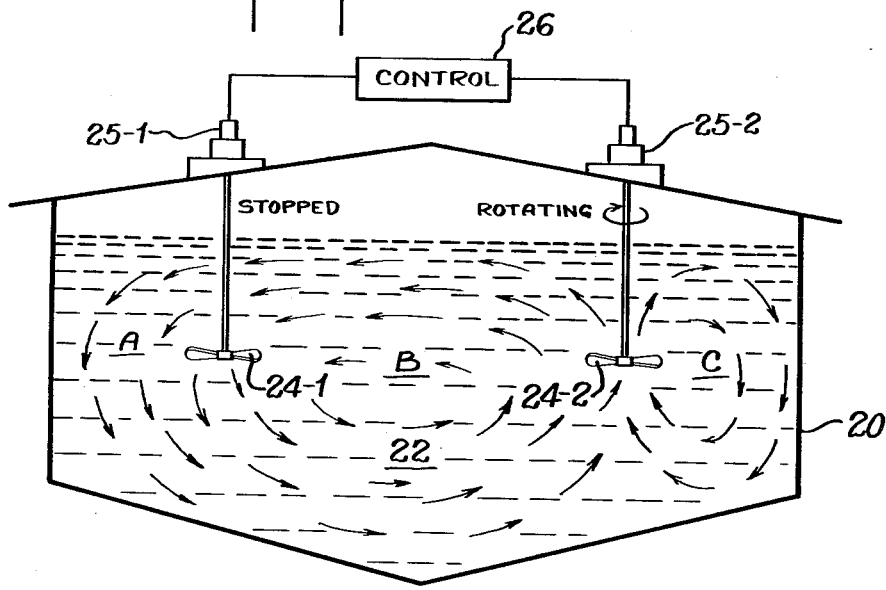

In the drawings, wherein, for the purpose of illustration, are shown various embodiments of the invention, the numeral 20 designates a large vessel containing a plurality of ingredients, at least one of which is a liquid. The contents 22 of the vessel 20 are caused to move by rotating propellers (motion inducing means) 24–1 and 24–2. Propellers 24–1 and 24–2 are suitably driven by motors 25–1 and 25–2 which are controlled by mixing control 26. Other mechanical means such as paddles, wheels and similar devices may be used in place of the propellers. Moreover, other motion inducing means may be substituted for the mechanical means as will be evident further on in this description.

In FIGURE 1 there is illustrated the uniform liquid motion pattern (shown by the arrows) which exists after propeller 24–1 has rotated for almost all of its time period, while propeller 24–2 has been stopped. At this point, it is seen from the arrows that there are essentially two patterns set up in the vessel: the first in sector A; and the second in the combined sectors B and C.

In FIGURE 2, propeller 24–1 has stopped and propeller 24–2 has just started. In sector A, at this time, the liquid movement is only moderately influenced by the energy imparted by propeller 24–2. In sector C, the liquid movement is under greater influence from the action of propeller 24–2. In sector B, the movement of the liquid induced by propeller 24–1 is being counteracted (equal and directionally opposite energy vectors) by that induced by propeller 24–2 but the liquid movement has not yet been stabilized.

Simultaneously, an additional phenomenon is occurring which further increases true mixing. Ingredients from sector B which were previously induced to enter sector C (FIGURE 1) are now being induced to enter sector A, at the top. At the same time sector A ingredients are now being drawn into sector B, at the bottom. A similar but opposite change is occurring at the interface of sectors B and C, thus tending greatly to enlarge the volume of the interfering action to include essentially the entire cross section.

In FIGURE 3, propeller 24–2 is near the end of its "on" period and the liquid motion in sector C and in combined sectors A and B has been stabilized.

Figure 4:
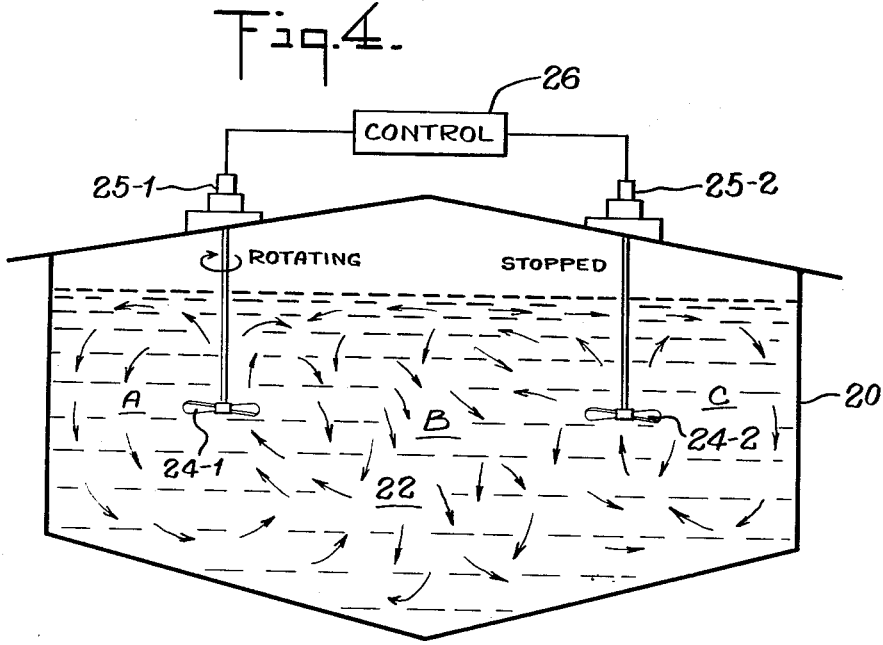

In FIGURE 4, propeller 24–2 has stopped and propeller 24–1 has just started. In sector C, at this time, the liquid movement is only moderately influenced by the energy imparted by propeller 24–1. In sector A, the liquid movement is under greater influence from the action of propeller 24–1. In sector B, the movement of the liquid 24–2 is being counteracted by that induced by propeller 24–1 but the liquid movement has not yet been stabilized. The reverse of the phenomenon taking place in sector B (FIGURE 2) now takes place and true, interfering current, mixing occurs.

The operation described above continues and the interfering currents of the contents 22 set up in the tank 20 produce an efficient conversion of horsepower into true mixing energy without the use of baffles. For large vessels it is better to use several motion inducing means and wherever possible to have each operation oppositely disposed from the most immediate preceding operation. This concept will be discussed in connection with the description of FIGURES 7 and 8.

Figure 5:
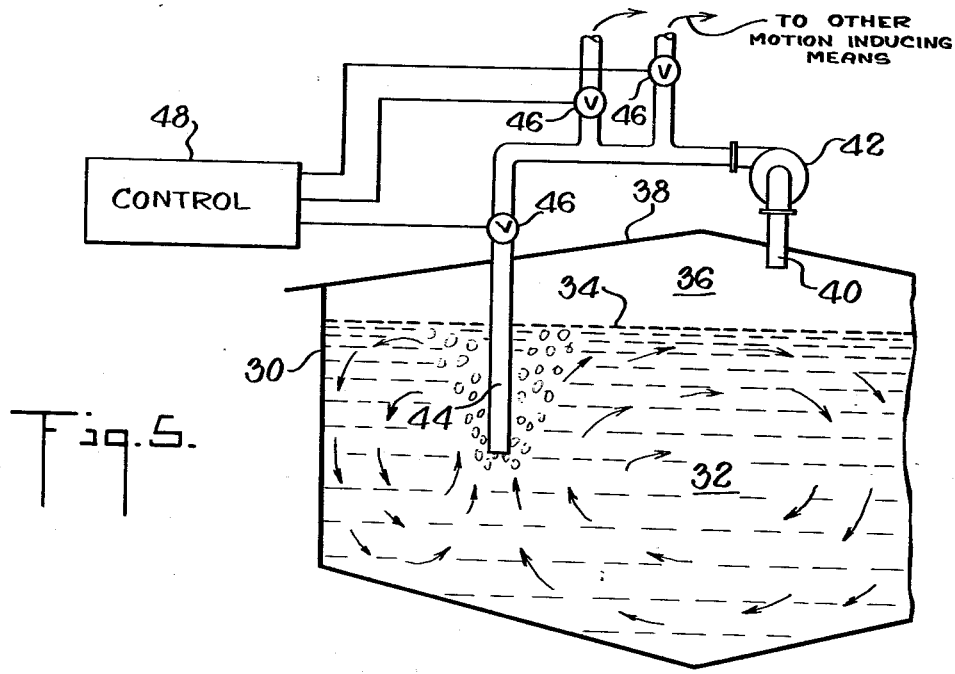
FIGURE 5 is a diagrammatic elevational view of a portion of a large vessel in which an open gas discharge is used as the motion inducing means.

FIGURE 5 is an elevational diagrammatic illustration of a portion of tank 30 in which a gas producing reaction of contents 32 is taking place. The gas 36 is generated by the reaction and rises above the liquid level 34 and is held within the tank 30 by dome 38. Gas 36 enters pipe 40 and is pumped by pump 42 directly to one or more of the gas dicharge pipes 44 depending on which of the valves 46 are open. The programming to open and close the proper valves 46 is controlled by means of mixing control 48 which is automated by means of a timer or similar device and a selector to maintain the proper "on" and "off" times and the proper sequence of operation (details not shown).

The gas bubbles ejected from tube 44 set up a pattern of liquid motion as shown in FIGURE 5. The operation of two gas discharge pipes 44 alternately as described in connection with the illustrations of FIGURES 1–4 will produce the desired interfering currents.

Figure 6:
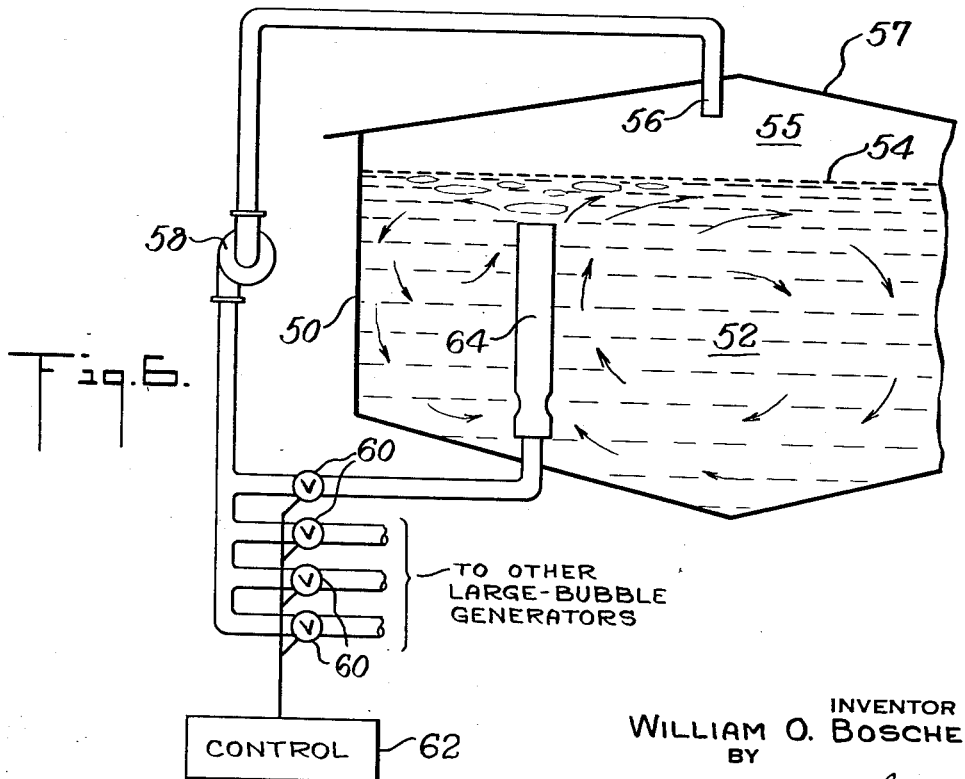
FIGURE 6 is a view similar to FIGURE 5, of a form of apparatus of the invention, in which a large-bubble generator is used as the motion inducing means.

FIGURE 6 is a view of a preferred form of the invention, similar to that of FIGURE 5 wherein the motion inducing means are large-bubble generators and associated large diameter, vertical conduits such as have been described in U.S. Patents 2,967,399, 3,148,509 and 3,246,761. For the purpose of this application, these devices have been designated as large-bubble generator assemblies.

Gas 55 formed as a result of the decomposition of ingredients 52 in tank 50 rises above the liquid level 54 and is held captive under cover 57. The gas then enters pipe 56 and is pumped by pump 58 through the appropriate open valve 60 to large-bubble generator 64. Mixing control 62 is similar to control 48 and serves to open and close the proper valves 60 for the proper time and in the proper sequence. The large-bubble generator assembly 64 produces motion in liquid 52 as shown by the arrows in FIGURE 6.

A pair of large-bubble generator assemblies operating alternately as described in connection with FIGURES 1–4 will produce the same type of true interfering currents as were produced by the mechanical means described heretofore.

Figure 7:
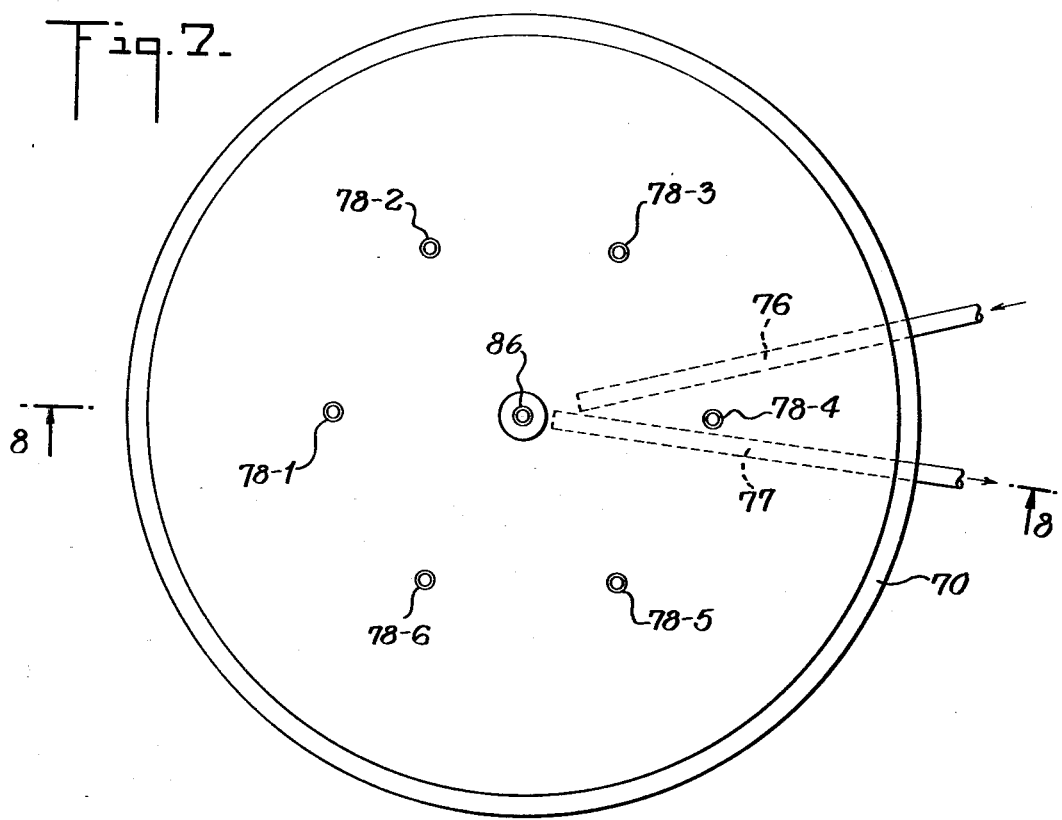
FIGURE 7 is a plan view of apparatus of the invention using six motion inducing means.
Figure 8:
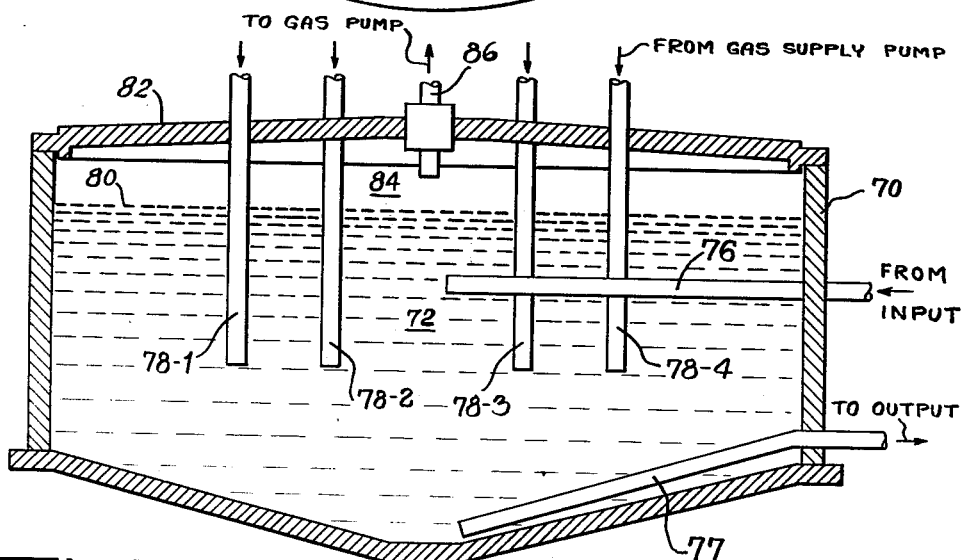
FIGURE 8 is a sectional view taken on lines 8—8 of FIGURE 7, viewed in the direction of the arrows.

FIGURES 7 and 8 are plan and sectional, elevational views of the invention as it might be used, for example, in an anaerobic waste water treatment tank 70. Contents 72 are fed to the tank through pipe 76 and the stabilized product is withdrawn through pipe 77. In the particular form illustrated, six gas discharge pipes 78–1, 78–2, 78–3, 78–4, 78–5 and 78–6 are connected through suitable valves and mixing controls to a pump (not shown). Gas 84 generated by the process is trapped between cover 82 and liquid level 80. The gas is pumped through pipe 86 to the valves which are opened and closed in accordance with a predetermined program as has been described heretofore. Large-bubble generator assemblies or mechanical, motion inducing, means may be substituted for the gas discharge pipes.

To produce best results using the teaching of the invention, it is advisable that energy applications be induced from a point or points diametrically opposite the point or points from which the immediately preceding application of energy was made at least 50% of the operating time. This opposite condition should be approached as closely as practical for the other 50% of the operating time. For example, if there are six such points arranged at the vertices of a regular hexagon, points 1 and 2 together are diametrically opposite points 4 and 5 together, point 1 is diametrically opposite point 4 and so on, Without limitation of the scope of the invention, following are two examples of programs which, with proper selection of the gas pumping rate, will produce uniformly distributed, true, interfering current, mixing conditions in a tank whose dimensions are:

110 ft. diameter x 32 ft. sidewater depth.

Example I

78–1 and 78–2 on simultaneously for 15 minutes
78–4 and 78–5 on simultaneously for 15 minutes
78–3 on for 15 minutes
78–6 on for 15 minutes Return to 78–1 and 78–2, and continue repeated operation.

Example II

|      | Minutes |
|------|---------|
| 78–1 | 15 |
| 78–4 | 15 |
| 78–2 | 15 |
| 78–5 | 15 |
| 78–3 | 15 |
| 78–6 | 15 |

Return to 78–1 and continue repeated operation.

Depending upon the size of the tank and the type of material being processed, the method and apparatus of the invention has been found to have practical use with from 2 to 12 application points. However, the processing of certain mixtures may require more than 12 application points under some conditions.

As various changes could be made in the above described method and apparatus without departing from the scope of the invention, it is intended that all matter contained in the above description or shown in the accompanying drawings shall be interpreted as illustrative and not in a limiting sense.

Having thus described the invention, I claim:

1. The method of mixing a plurality of ingredients, at least one of which is a liquid, in a large vessel to maximize turbulent liquid movement and minimize uniform or laminar flow by producing true, interfering current, mixing in the absence of baffles, partitions or flow intercepting surfaces which comprises:
   inducing motion of the plurality of ingredients from a plurality of spaced points within the vessel in a time sequence and for periods of time such that the motion induced from at least one of the spaced points continues only long enough to interrupt and counteract the liquid motion pattern previously induced and to set up a new, liquid motion, pattern in such a manner as to produce, after a plurality of such periods of time, a series of short duration, interfering current, liquid mixing, motions throughout the entire volume of the contents of the vessel.

2. The method of claim 1 wherein there are not more than twelve such spaced points within the vessel.

3. The method of claim 2 wherein the points are uniformly spaced in plan view at a horizontal distance from the center of the vessel between one third and two thirds of the distance from the center of the vessel to the side wall of the vessel.

4. The method of claim 2 wherein there are six spaced points, denominated 1, 2, 3, 4, 5, 6 in clockwise order; the mixing program cycle being comprised of inducing motion of the plurality of ingredients for about equal periods of time as follows: 1 and 2 simultaneously; 4 and 5 simultaneously; 3; 6; 1 and 2 simultaneously; and so on.

5. The method of claim 2 wherein there are six spaced points, denominated 1, 2, 3, 4, 5, 6 in clockwise order; the mixing program cycle being comprised of inducing motion of the plurality of ingredients for about equal periods of time as follows: 1; 4; 2; 5; 3; 6; 1 and so on.

6. The method of claim 2 wherein motion is induced from a point essentially diametrically opposite the preceding point in the sequence for at least half of the sequences; and wherein this condition is approached as nearly as practical during the other half of the sequences.

7. A device for mixing a plurality of ingredients, at least one of which is a liquid, in a large vessel to maximize turbulent liquid movement and minimize uniform or laminar flow by producing true, interfering current, mixing in the absence of baffles, partitions or flow intercepting surfaces which comprises:
   a vessel containing the plurality of ingredients;
   a plurality of spaced, motion inducing, means placed below the liquid level within the vessel;
   actuating means for actuating the spaced, motion inducing, means;
   programming means for programming the actuating means in a time sequence and for periods of time such that the motion induced from at least one of the spaced, motion inducing, means continues only long enough to interrupt and counteract the liquid motion pattern previously induced and to set up a new, liquid motion, pattern in such a manner as to produce, after a plurality of such periods of time, a series of short duration, interfering current, liquid mixing, motions throughout the entire volume of the contents of the vessel.

8. A device as described in claim 7 wherein the number of motion inducing means is not more than twelve.

9. A device as described in claim 8 wherein the programming means sequences a point essentially diametrically opposite the preceding point in the sequence, for at least half of the sequences and wherein this condition is approached as nearly as practical for the other half of the sequences.

10. A device as described in claim 8 wherein there are six such spaced, motion inducing, means, each of which is located outwardly from the center of the vessel at a distance of one third to two thirds the straight line distance from the center of the vessel to the side wall of the vessel.

11. A device as described in claim 10 wherein the six spaced, motion inducing, means are denominated 1, 2, 3, 4, 5 and 6 in clockwise order and the actuating means for actuating the spaced, motion inducing, means is programmed by the programming means to operate the said spaced, motion inducing, means as follows. 1 and 2 simultaneously; 4 and 5 simultaneously; 3; 6; 1 and 2 simultaneously; and so on.

12. A device as described in claim 10 wherein the six spaced, motion inducing, means are denominated 1, 2, 3, 4, 5, 6 in clockwise order and the actuating means for actuating the spaced, motion inducing, means is programmed by the programming means to operate the spaced, motion inducing means as follows: 1; 4; 2; 5; 3; 6; 1 and so on.

13. A device as described in claim 7 wherein the spaced, motion inducing, means are movable, mechanical elements.

14. A device as described in claim 7 wherein the spaced, motion inducing, means comprise gas ports and means for supplying gas thereto.

15. A device as described in claim 7 wherein the spaced, motion inducing, means comprise large-bubble generator assemblies.

References Cited

UNITED STATES PATENTS

| 3,083,538 | 4/1963 | Gross | 259—95 X |
| 3,271,304 | 9/1966 | Valdespino et al. | 259—95 X |
| 3,305,340 | 2/1967 | Atkeson | 259—95 X |

ROBERT W. JENKINS, *Examiner.*